(12) United States Patent
Chang et al.

(10) Patent No.: US 7,505,181 B2
(45) Date of Patent: *Mar. 17, 2009

(54) OPERATING METHOD AND CHANGER FOR OPTICAL MODULE/PRINTER MODULE SYSTEM

(76) Inventors: Wen-Yuan Chang, No. 430, Hsita Rd., Hsinchu (TW); Chih-Wen Huang, 3F., No. 13, Alley 3, Lane 33, Kung-Kou St., Shiang-Shan, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/857,411

(22) Filed: Oct. 4, 2007

(65) Prior Publication Data

US 2008/0130020 A1 Jun. 5, 2008

Related U.S. Application Data

(63) Continuation of application No. 10/604,251, filed on Jul. 4, 2003, now Pat. No. 7,289,250.

(30) Foreign Application Priority Data

Jul. 22, 2002 (TW) ............................... 91116235 A (51) Int. Cl.
*H04N 1/024* (2006.01)
*H04N 1/04* (2006.01)

(52) U.S. Cl. ...................... 358/472; 358/496; 358/497; 358/474

(58) Field of Classification Search ................. 358/472, 358/496, 497, 474, 494, 498, 482
See application file for complete search history.

(56) References Cited

U.S. PATENT DOCUMENTS

| | | | | | |
|---|---|---|---|---|---|
| 4,827,355 | A | * | 5/1989 | Kotani et al. | 358/296 |
| 5,162,916 | A | * | 11/1992 | Stemmle et al. | 358/296 |
| 5,267,056 | A | * | 11/1993 | Stemmle | 358/472 |
| 5,376,987 | A | * | 12/1994 | Onuki | 355/45 |
| 6,164,755 | A | * | 12/2000 | Yamamoto | 347/37 |
| 6,276,771 | B1 | * | 8/2001 | Kim et al. | 347/3 |
| 6,353,485 | B1 | * | 3/2002 | Kaneko | 358/1.2 |

* cited by examiner

*Primary Examiner*—Houshang Safaipour
(74) *Attorney, Agent, or Firm*—Stolowitz Ford Cowger LLP (57) ABSTRACT

A method of operating an optical module/printer module system through a changer such that either the optical module or the printer module is driven. A first module and a second module is defined such that if the first module is an optical module, the second module is a printer module and if the first module is a printer module, the second module is an optical module. The operating method includes the following steps. In step one, the changer engages with the first module and drives the first module. In step two, the changer rotates so that the changer detaches from the first module and engages with the second module. In step three, the changer drives the second module.

17 Claims, 7 Drawing Sheets

OPERATING METHOD AND CHANGER FOR OPTICAL MODULE/PRINTER MODULE SYSTEM

CROSS REFERENCE TO RELATED APPLICATIONS

This application is a continuation of U.S. patent application Ser. No. 10/604,251, filed on Jul. 4, 2003 now U.S. Pat. No. 7,289,250 and claims priority to Taiwan Application Serial No. 91116235, filed on Jul. 22, 2002, the disclosure of which is incorporated herein by reference.

BACKGROUND OF INVENTION

1. Field of Invention

The present invention relates to an operating method and a changer for an optical module/printer module system.

More particularly, the present invention relates to an operating method and a changer for an optical module/printer module system capable of reducing overall drive loading.

2. Description of Related Art

Following the rapid progress in electronic technologies and development of multimedia techniques, most products incorporate a few functions so as to reduce spatial occupation. For example, a machine may combine various functions including facsimile, scanning, copying and telephoning together so that many applications can be performed without occupying too much space.

Figure 1:
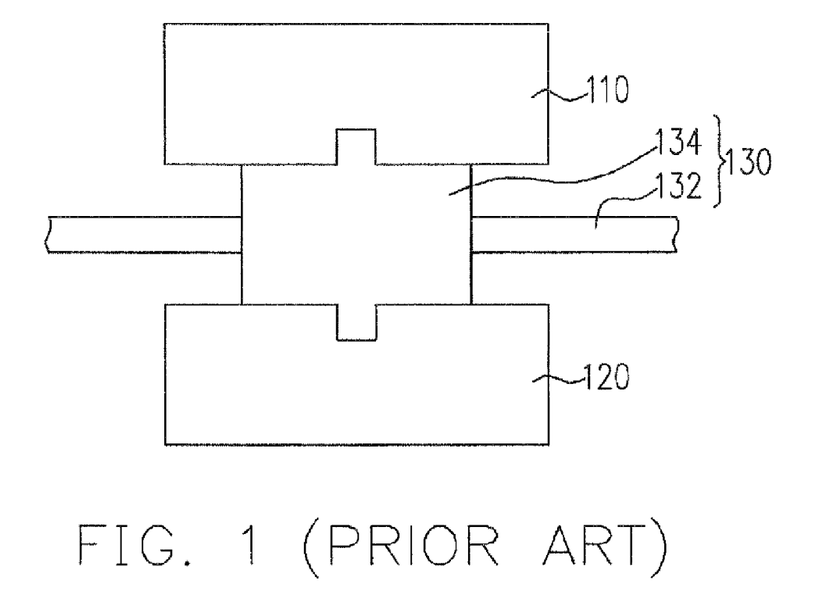
FIG. 1 is a schematic diagram showing the operational linkage of a conventional optical module/printer module system.

FIG. 1 is a schematic diagram showing the operational linkage of a conventional optical module/printer module system. To integrate scanning and printing function together, a multifunction machine often has an optical module 110 and a printer module 120. The multifunction machine is able to scan a document through the optical module 110 and print a document through the printer module 120. The multifunction machine further includes a transmission mechanism 130 for driving the optical module 110 and the printer module 120. The transmission mechanism 130 includes an electric motor (not shown), a driving belt 132 and a coupling structure 134. The electric motor drives the driving belt 132 while the coupling structure 134 is attached to the driving belt 132. The coupling structure 134 engages with the optical module 110 and the printer module 120. Hence, the optical module 110 and the printer module 120 move synchronously together when the electric motor pulls the driving belt 132.

Using the aforementioned multifunction machine, the optical module 110 must be driven to scan a document (not shown). However, through the coupling structure 134, the printer module 120 is also driven. With such unnecessary coupling, the electric motor needs to carry an extra load so that power is wasted. Similarly, the optical module 110 is also driven when the printing module 120 prints out a document. Hence, an extra load is carried and power is wasted.

SUMMARY OF INVENTION

Accordingly, one object of the present invention is to provide a method of operating an optical module/printer module system and a changer for selectively coupling with either the optical module or the printer module such that overall driving load of a driver is reduced and power is saved.

To achieve these and other advantages and in accordance with the purpose of the invention, as embodied and broadly described herein, the invention provides a method of operating a multi-modular system. Either a first module or a second module is driven by selection through a module changer. The method of operating the multi-modular system includes the following steps.

In the first step, a changer is provided. The changer comprises a roller, a first lever rod and a second lever rod. The roller has a first spiral groove and a second spiral groove. The first spiral groove and the second spiral groove spirals around the central axis of the roller on a perimeter surface of the roller. Depth of the first and the second spiral groove from the perimeter surface of the roller increases gradually but the direction of increasing depth in the second spiral groove is opposite to the direction of increasing depth in the first spiral groove. The roller is constrained to travel in a linear direction. The first lever rod and the second rod are situated at the same end along the path traveled by the roller. The roller further includes a latching element on the perimeter surface of the roller. If the changer joins with the first module through the latching element initially, the changer drives the first module. In the second step, the roller moves to one end of its travel path close to the first lever rod. In the third step, the first lever rod dips into the first spiral groove and presses against the bottom surface of the first spiral groove so that the roller rotates. The latching element of the roller now detaches from the first module and engages with the second module. In the fourth step, the changer drives the second module forward along the travel path of the roller. In the fifth step, the roller moves to another end of its travel path close to the second lever rod. In the sixth step, the second rod dips into the second spiral groove and presses against the bottom surface of the second spiral groove so that the roller rotates. The latching element of the roller now detaches from the second module and engages with the first module. In the seventh step, the roller drives the first module forward along the travel path of the roller.

This invention also provides an alternative method of operating a multi-modular system. Either a first module or a second module is driven by selection through a module changer. The method of operating the multi-modular system includes the following steps.

In the first step, a changer is provided. The changer comprises of a roller, a first lever rod and a second lever rod. The roller has a first side surface and a corresponding second side surface. The roller also has a first spiral groove and a second spiral groove. The first spiral groove spirals around the central axis of the roller on the first side surface of the roller. Depth of the first spiral groove from the first side surface of the roller increases gradually. The second spiral groove spirals around the central axis of the roller on the second side surface of the roller. Depth of the second spiral groove from the second side surface of the roller increases gradually. The roller is constrained to travel in a linear direction. The first lever rod and the second rod are situated at the respective opposite ends of the path traveled by the roller. The roller further includes a first latching element, a second latching element and a third latching element on the perimeter surface of the roller. If the changer joins with the first module through the first latching element initially, the changer drives the first module. In the second step, the roller moves to one end of its travel path close to the first lever rod. In the third step, the first lever rod dips into the first spiral groove and presses against the bottom surface of the first spiral groove so that the roller rotates in a first direction. The first latching element of the roller now detaches from the first module and the second latching element of the roller engages with the first module. In the fourth step, the roller moves to another end of the travel path close to the second lever rod. In the fifth step, the second lever rod dips into the second spiral groove and presses against the bottom surface of the second spiral groove so that the roller rotates in a second direction. The second direction is just the opposite of the first direction. The second latching element of the roller now detaches from the first module and the third latching element of the roller engages with the second module. In the sixth step, the roller drives the second module forward along the travel path of the roller. In the seventh step, the roller moves to one end of its travel path close to the second lever rod. In the eighth step, the second lever rod dips into the second spiral groove and presses against the bottom of the second spiral groove so that the roller rotates in the second direction. The third latching element detaches from the second module and the first latching element of the roller engages with the first module. In the ninth step, the roller drives the first module along the path traveled by the roller.

In the aforementioned method of operating a multi-modular system, when the first module is an optical module, the second module is a printer module. Similarly, when the first module is a printer module, the second module is an optical module. The first latching element, the second latching element and the third latching element are bump-shape structures. When an external force is applied to the first latching element, the second latching element or the third latching element, these elements may retract inwards towards the interior of the roller. However, when the external force is removed, these latching elements may bounce back to their original positions. In addition, the first lever rod is fixed in position. The first lever rod dips into the first spiral groove through the movement of the roller and the bottom section of the first spiral groove props against the first lever rod so that the roller rotates. The second lever rod is also fixed in position. The second lever rod dips into the second spiral groove through the movement of the roller and the bottom section of the second spiral groove props against the second lever rod so that the roller rotates.

In brief, the method of operating the optical module/printer module system and the optical module/printer module system changer according to this invention is able to reduce the loading of a driving motor and hence saves energy.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings.

Wherever possible, the same reference numbers are used in the drawings and the description to refer to the same or like parts.

Figure 2:
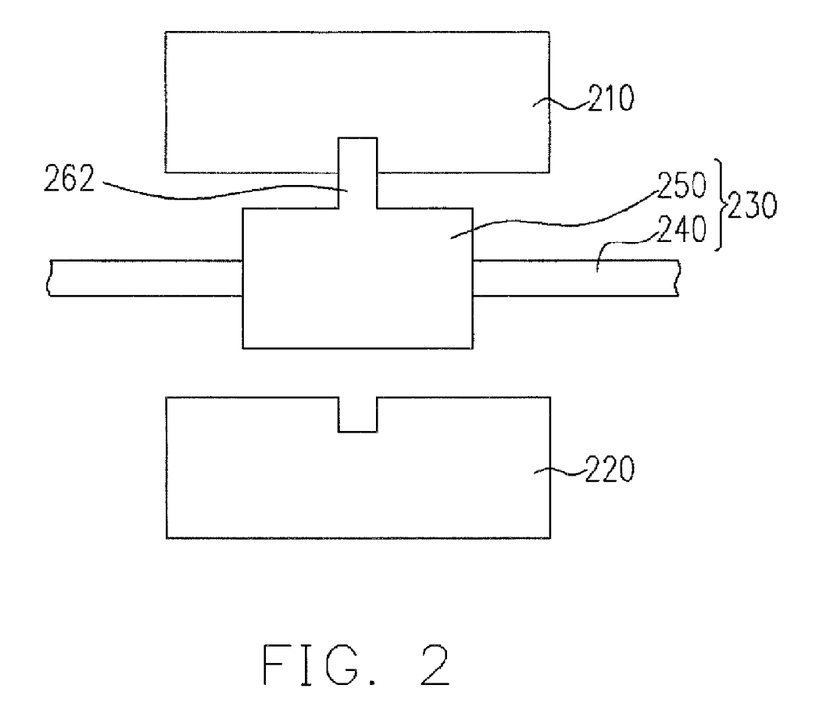
FIG. 2 is a schematic diagram showing a changer driving an optical module according to one preferred embodiment of this invention.
Figure 3:
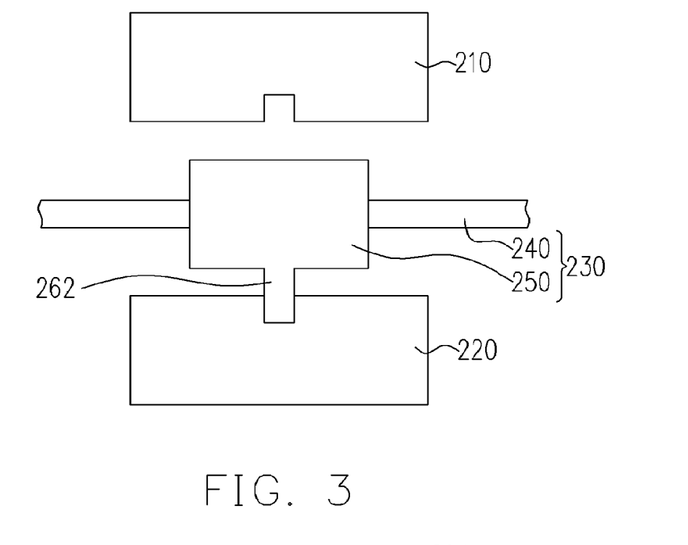
FIG. 3 is a schematic diagram showing a changer driving a printer module according to one preferred embodiment of this invention.

FIG. 2 is a schematic diagram showing a changer driving an optical module according to one preferred embodiment of this invention. FIG. 3 is a schematic diagram showing a changer driving a printer module according to one preferred embodiment of this invention. A multifunction station needs to engage with an optical module 210 or a printer module 220. In general, documents are scanned through the optical module 210 while documents are printed through the printer module 220. Each multifunction station has a transmission mechanism 230 for driving the optical module 210 and the printer module 220. The transmission mechanism 230 typically includes an electric motor (not shown), a driving belt 240 and a changer 250. The driving belt 240 is driven by the electric motor and the changer is fastened to the driving belt 240. The changer 250 has a latching element 262 capable of coupling with either the optical module 210 or the printer module 220. As the electric motor moves the driving belt 240, the optical module 210 or the printer module 220 will move synchronously.

As shown in FIG. 2, the changer 230 is coupled to the optical module 210 so that the optical module 210 moves synchronously to perform a scanning operation when the driving belt 240 is driven by the electric motor. To conduct a printing operation after the scanning operation, the changer 250 must rotate to detach the latching element 262 of the changer 250 from the optical module 210 and re-engage with the printer module 220. Hence, the printer module 220 moves synchronously to print a document when the driving belt 240 is driven by the electric motor.

Figure 4:
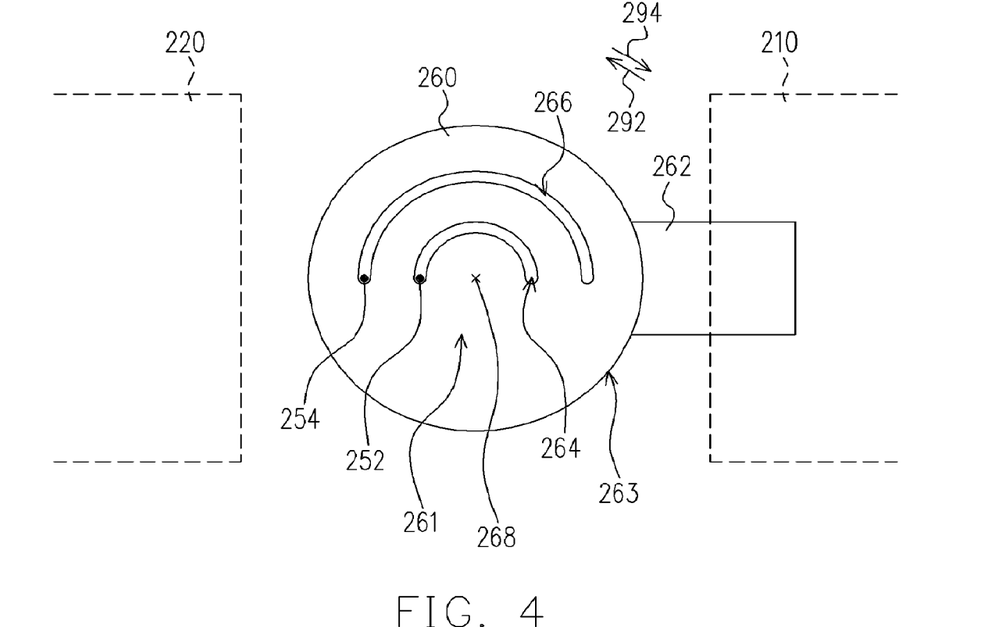
FIG. 4 is a magnified side view showing the coupling between the roller of a changer and an optical module according to one preferred embodiment of this invention.
Figure 5:
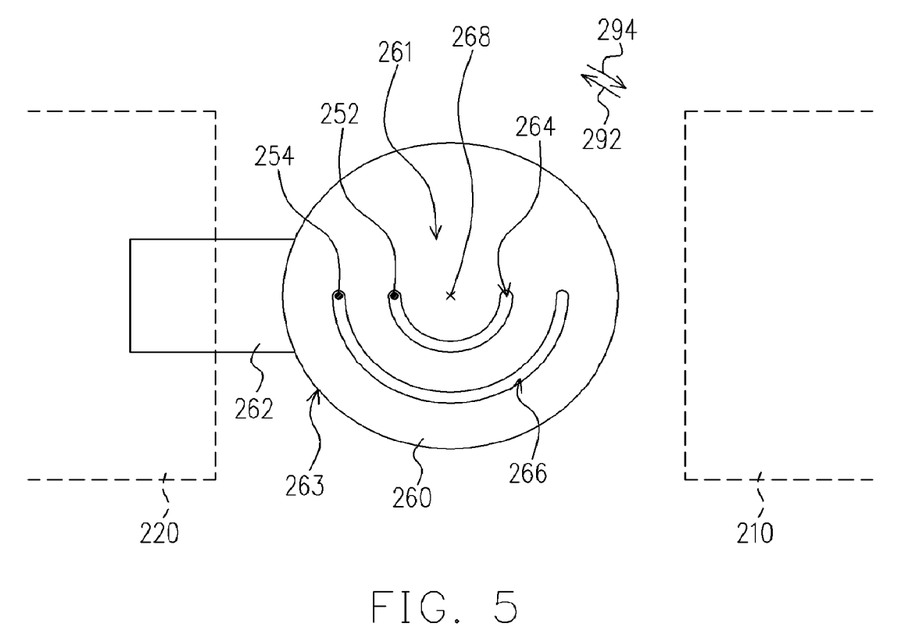
FIG. 5 is a magnified side view showing the coupling between the roller of a changer and a printer module according to one preferred embodiment of this invention.
Figure 6:
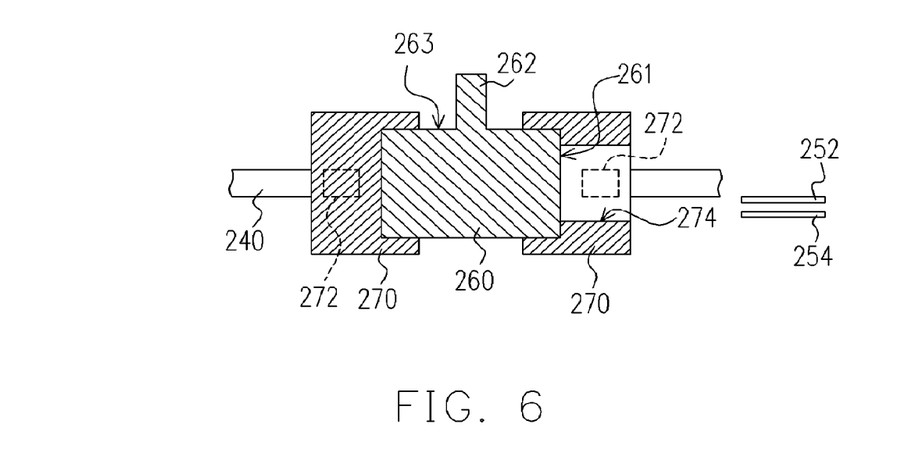
FIG. 6 is a cross-section view of a changer according to one preferred embodiment of this invention.

The following is a detailed description of the changer and its operation. FIG. 4 is a magnified side view showing the coupling between the roller of a changer and an optical module according to one preferred embodiment of this invention. FIG. 5 is a magnified side view showing the coupling between the roller of a changer and a printer module according to one preferred embodiment of this invention. FIG. 6 is a cross-section view of a changer according to one preferred embodiment of this invention. As shown in FIGS. 4, 5 and 6, the changer includes a first lever rod 252, a second lever rod 254, a roller 260 and a pair of carrier blocks 270. Each carrier block 270 includes a latching structure 272. Through the latching structure 272, the carrier block 270 is fastened to the driving belt 240. The roller 260 is bracketed within the carrier blocks 270 but is free to rotate within the carrier blocks 270. The roller 260 has a latching element 262 such as a bump attached to the perimeter surface 263 of the roller 260 for engaging with either the optical module 210 or the printer module 220. The roller 260 further includes a first spiral groove 264. The first spiral groove 264 spirals around the central axis 268 on a side surface 261 of the roller 260 and depth of the first spiral groove 264 increases gradually in a clockwise direction. The roller 260 further includes a second spiral groove 266. The second spiral groove 266 spirals around the central axis 268 on a side surface 261 of the roller 260 and depth of the second spiral groove 266 increases gradually in an anti-clockwise direction. In addition, the carrier block 270 has a hole 274 through which the first lever rod 252 may pass into the first spiral groove 264 and the second lever rod 254 may pass into the second spiral groove 266.

As shown in FIG. 4, the changer 250 and the optical module 210 are coupled together so that the optical module 210 moves synchronously when the driving belt 240 is driven by the electric motor. To conduct a printing operation after the scanning operation, the roller 260 must be rotated. The driving belt 240 drives the roller 260 to the rightmost position as shown in FIG. 6 before stopping. The first lever rod 252 protrudes out, dips into the first spiral groove 264 and presses against the bottom surface of the first spiral groove 264 so that the roller 260 rotates in an anti-clockwise direction 292 for a total of 180.degree. Hence, the latching element 262 of the roller 260 detaches from the optical module 210 and re-engages with the printer module 220 in a configuration as shown in FIG. 5. Ultimately, the printer module 220 is able to move synchronously and print out documents when the driving belt 240 is driven by the electric motor. To conduct a scanning operation after printing, the changer 250 must rotate. The driving belt 240 drives the roller 260 to the rightmost position as shown in FIG. 6 before stopping. The second lever rod 254 protrudes out, dips into the second spiral groove 266 and presses against the bottom surface of the second spiral groove 266 so that the roller 260 rotates in a clockwise direction 294 for a total of 180.degree. Hence, the latching element 262 of the roller 260 detaches from the printer module 220 and re-engages with the optical module 210 in a configuration as shown in FIG. 4. Thus, the optical module 210 is able to move synchronously and scan documents when the driving belt 240 is driven by the electric motor. The aforementioned steps may be repeated to switch between scanning and printing.

Using the changer 250 as shown in FIGS. 2 to 6, the electric motor only has to drive the optical module 210 in a scanning operation. Similarly, the electric motor only has to drive the printer module 220 in a printing operation. Ultimately, overall loading of the electric motor for driving the optical module 210 and the printer module 220 is greatly reduced.

The embodiment of this invention is not limited to the aforementioned structure. The first lever rod and the second lever rod may be positioned on the left side of the driving belt so that switching between the optical module and the printer module may occur when the roller moves to the leftmost side.

Furthermore, depth of the second spiral groove may gradually increase in an anti-clockwise direction while depth of the first spiral groove increases in a clockwise direction. With this arrangement, the roller will rotate in the anti-clockwise direction when the second lever rod dips into the second spiral groove and presses against the bottom surface. Meanwhile, the latching element of the roller will detach from the optical module and engage with the printer module. Similarly, when the first lever rod dips into the first spiral groove and presses against the bottom surface, the roller will rotate in a clockwise direction. The latching element of the roller will detach from the printer module and re-engage with the optical module.

In the aforementioned method, the lever rods must be driven by an electric motor so that the lever rod moves forward to rotate the roller and switch between the optical module and the printer module. However, this is by no means the only method of switching between the optical module and the printer module according to this invention.

Figure 7:
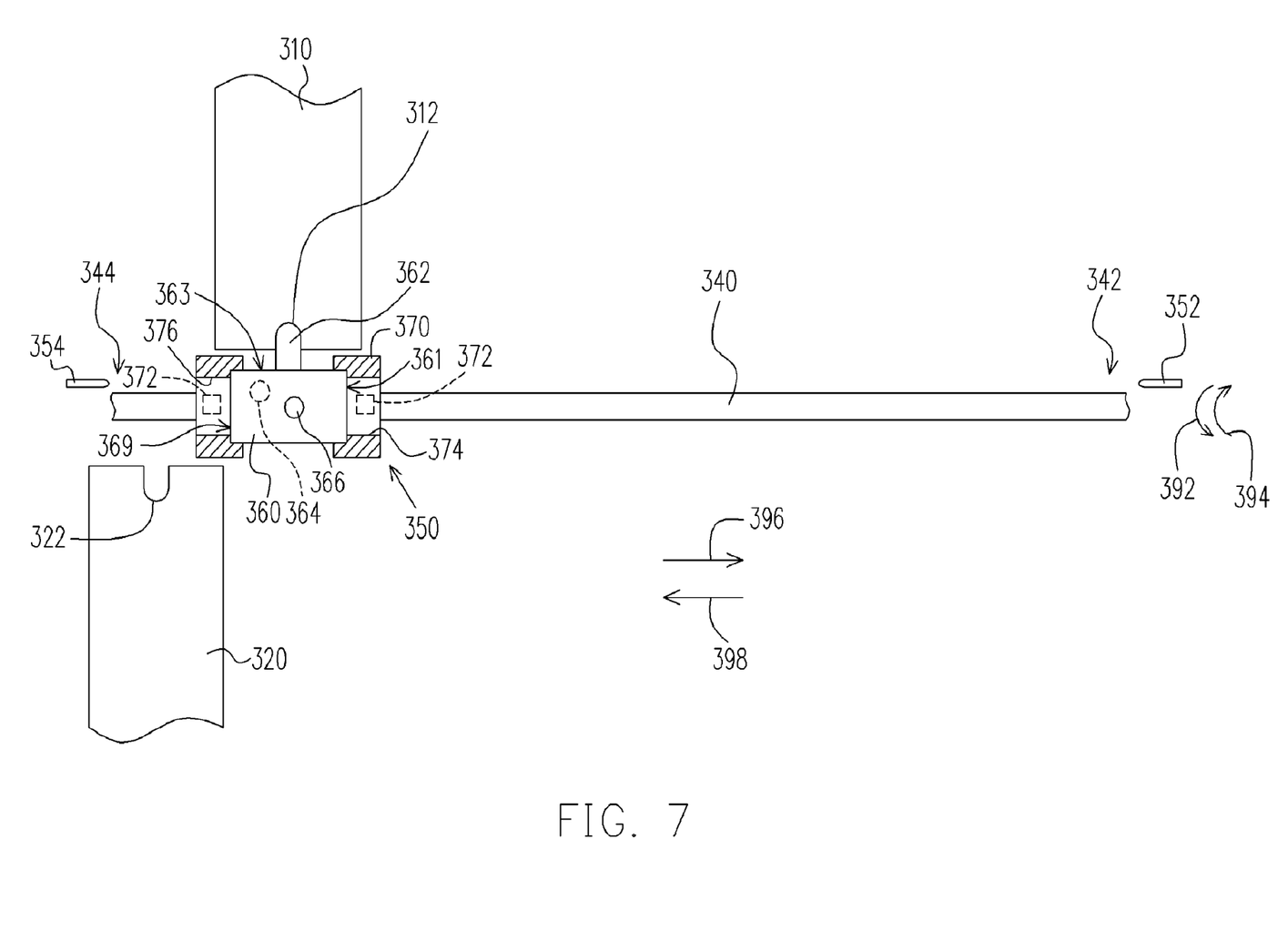
FIG. 7 is a schematic diagram showing a changer driving an optical module according to another preferred embodiment of this invention.

FIG. 7 is a schematic diagram showing a changer driving an optical module according to another preferred embodiment of this invention. Each multifunction station has a transmission mechanism for driving an optical module 310 and a printer module 320. The transmission mechanism typically includes an electric motor (not shown), a driving belt 340 and a changer 350. The changer 350 at least includes a roller 360 and a carrier block 370. The carrier block 370 has a fastening element 372 for fastening the carrier block 370 to the driving belt 340. The roller 360 is enclosed within the carrier block 370 and is able to rotate inside the carrier block 370. Hence, through the driving belt 340, the carrier block 370 and the roller 360 may move along a third direction 396 and a fourth direction 398. The roller 360 has a first latching element 362, a second latching element 364 and a third latching element 366. The first latching element 362, the second latching element 364 and the third latching element 366 all have a bump-shape structure attached to the perimeter surface 363 of the roller 360. The latching elements (362, 364, 366) rotate along with the roller 360 to carry out all the necessary switching action between the optical module 310 and the printer module 320. In addition, the first latching element 362, the second latching element 364 and the third latching element 366 can be retractable. In other words, each of the latching elements (362, 364, 366) may retract into the interior of the roller 360 when an external force is applied. As soon as the external force is removed, the latching elements may bounce back into their respective original state. The first latching element 362 and the second latching element 364 may engage with the optical module 310 and the third latching element 366 may engage with the printer module 320. Detailed description of these latching mechanisms is further explained below.

The changer 350 further includes a first lever rod 352 and a second lever rod 354. The first lever rod 352 and the second lever rod 354 are located at the respective ends such as a first end 342 and a second end 344 of the driving belt 340. When the changer 350 is pulled to the first end 342 or the second end 344 of the driving belt 340 and engaged with the first lever rod 352 or the second lever rod 354, the roller 360 may be driven into rotation by corresponding lever rods. The mechanism for rotating the roller 360 is explained in more detail below.

Figure 8A:
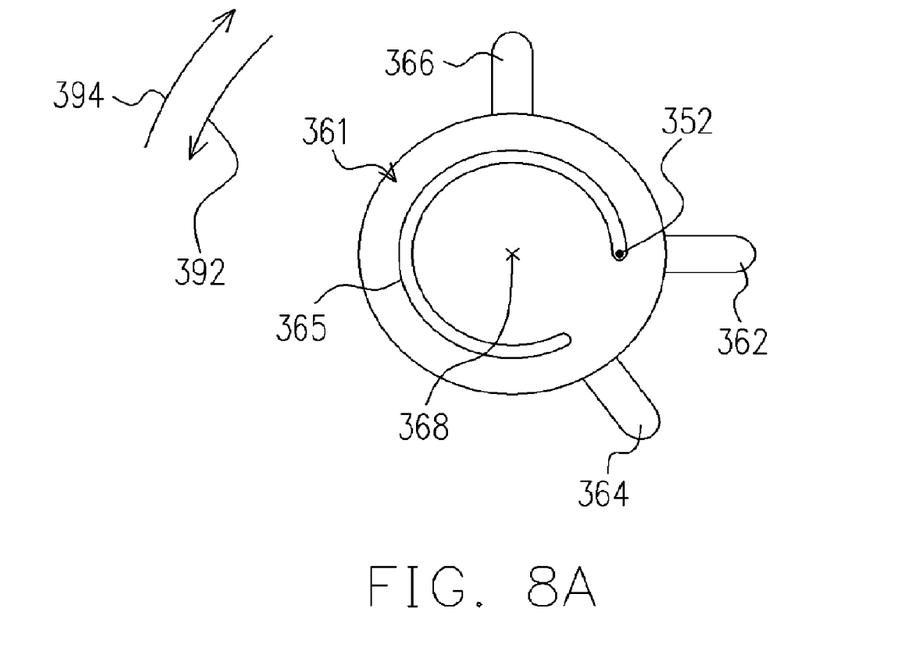
FIGS. 8A and 8B are views on the right side of FIG. 7 showing the roller driven by the first lever rod when the roller has already reached a first end of the driving belt.
Figure 8B:
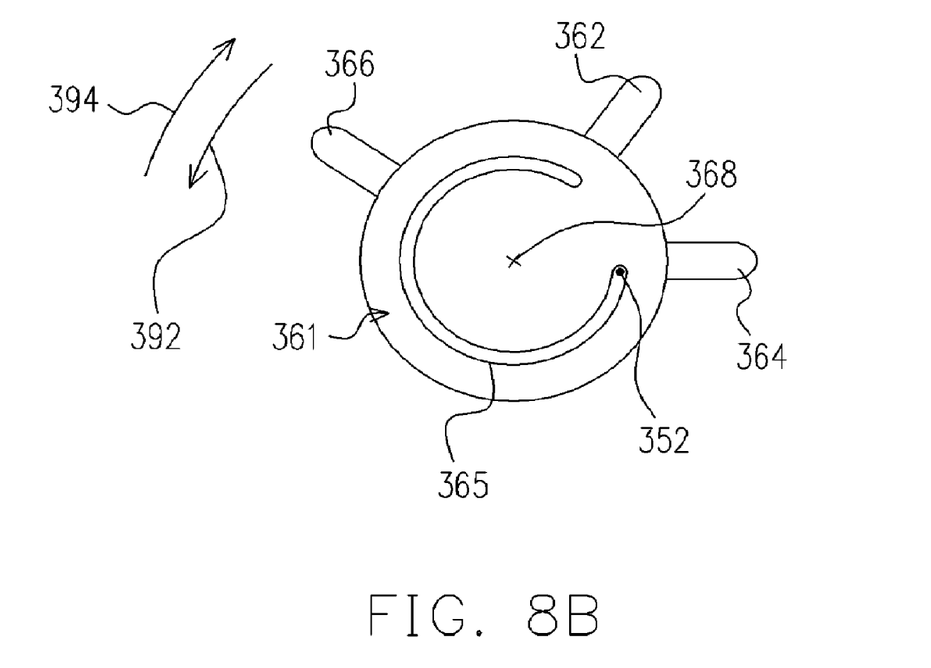

FIGS. 8A and 8B are views on the right side of FIG. 7 showing the roller driven by the first lever rod when the roller has already reached a first end of the driving belt. As shown in FIGS. 7, 8A and 8B, the roller 360 has a first spiral groove 365 that spirals on one side surface 361 of the roller around the roller axis 368. Depth of the first spiral groove 365 on the side surface 361 of the roller 360 increases gradually along a first direction 392. Position of the first lever rod 352 must correspond to the position of the first spiral groove 365. When the roller 360 rotates continuously towards a third direction 396, the first lever rod 352 passes through a first hole 374 in the carrier block 370 and dips into the first spiral groove 365. The first lever rod 352 presses against the bottom section of the first spiral groove 365 leading to a state as shown in FIG. 8A. The first lever rod 352 is fixed in position. Hence, through the continuous movement towards the third direction 396 of the roller 360, the first lever rod 352 is pressed against the bottom section of the first spiral groove 365 so that the roller 360 moves towards a second direction 394 as shown in FIG. 8B. In addition, by controlling the distance traveled by the roller 360 in the third direction 396, the angle of rotation of the roller 360 towards the second direction 394 is set.

Figure 9A:
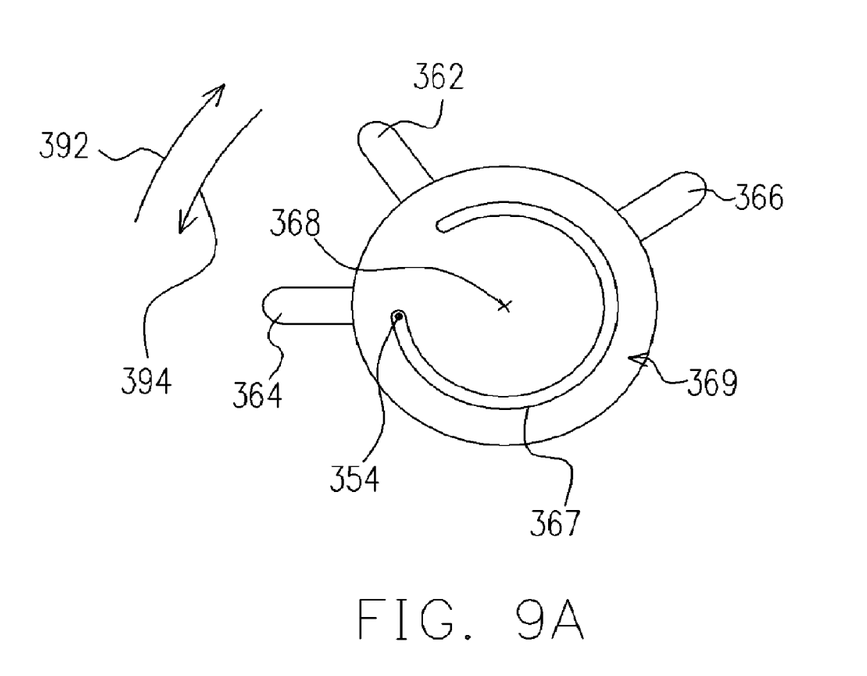
FIGS. 9A and 9B are views on the left side of FIG. 7 showing the roller driven by the second lever rod when the roller has already reached a second end of the driving belt.
Figure 9B:
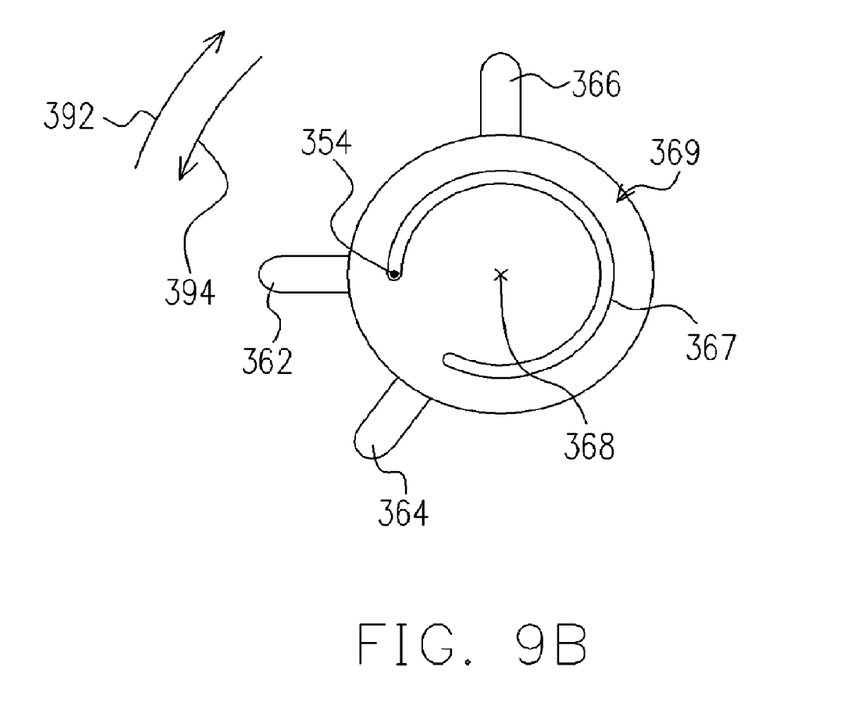

FIGS. 9A and 9B are views on the left side of FIG. 7 showing the roller driven by the second lever rod when the roller has already reached a second end of the driving belt. As shown in FIGS. 7, 9A and 9B, the roller 360 has a second spiral groove 367 that spirals on one side surface 369 of the roller 360 around the roller axis 368. Depth of the second spiral groove 367 on the side surface 369 of the roller 360 increases gradually along the second direction 394. Position of the second lever rod 354 must correspond to the position of the second spiral groove 367. When the roller 360 rotates continuously towards a fourth direction 398, the first lever rod 352 passes through a second hole 376 in the carrier block 370 and dips into the second spiral groove 367. The second lever rod 354 presses against the bottom section of the second spiral groove 367 leading to a state as shown in FIG. 9A. The second lever rod 352 is fixed in position. Hence, through the continuous movement towards the fourth direction 398 of the roller 360, the second lever rod 354 is pressed against the bottom section of the second spiral groove 367 so that the roller 360 moves towards the first direction 392 as shown in FIG. 9B. In addition, by controlling the distance traveled by the roller 360 in the fourth direction 398, the angle of rotation of the roller 360 towards the first direction 392 is set.

Figure 10A:
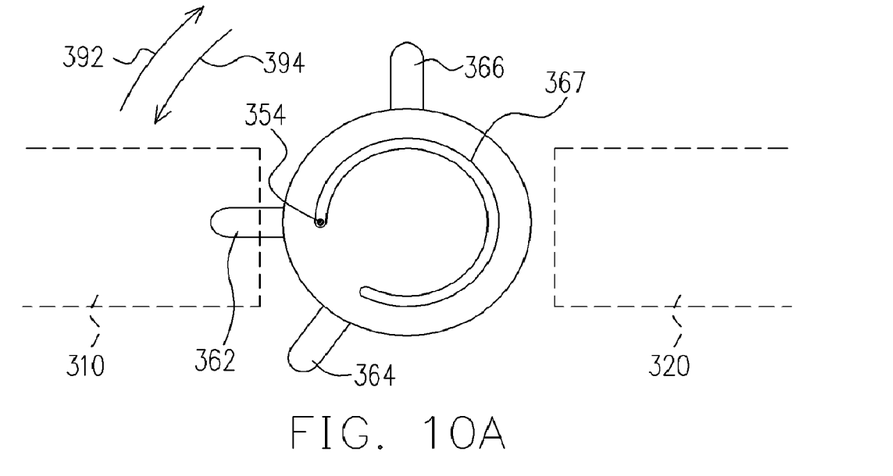
FIGS. 10A, 10B and 10C are views on the left side of FIG. 7 showing the process of engaging the changer to the optical module or the printer module.
Figure 10B:
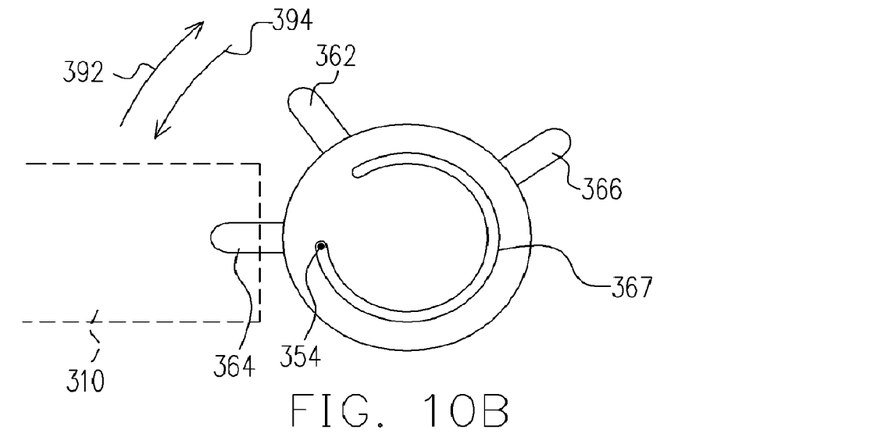
Figure 10C:
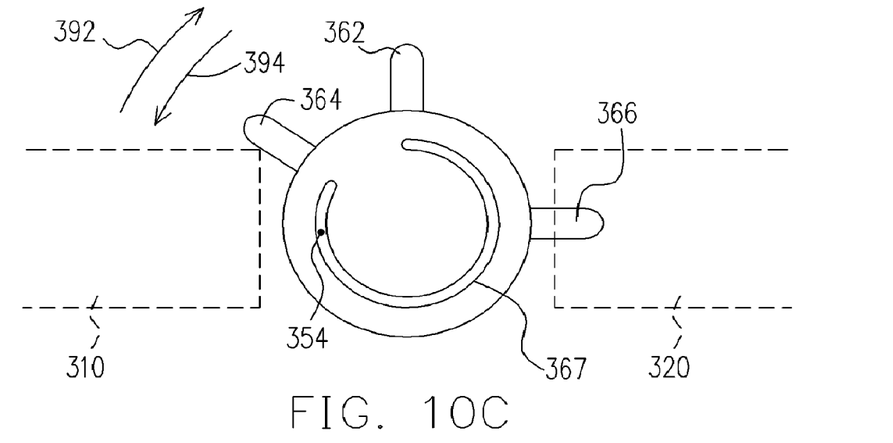

FIGS. 10A, 10B and 10C are views on the left side of FIG. 7 showing the process of engaging the changer to the optical module or the printer module. If the roller 360 is engaged to the optical module 310 through the first latching element 362 initially as shown in FIG. 10A, the optical module 310 is driven to carry out normal scanning operations.

To carry out a printing operation, the roller 360 must detach from the optical module 310 and re-engage with the printer module 320. First, the roller 360 moves to the first end 342 of the driving belt 340. Due to pressure on the first spiral groove 365 by the first lever rod 352 (as shown in FIGS. 8A and 8B), the roller 360 rotates in the second direction 394. At this moment, the first latching element 362 detaches from the optical module 310 and the second latching element 364 re-engages with the optical module 310 to form a configuration as shown in FIG. 10B. The second latching element 364 is somewhere along the direction of extension of the driving belt 360 and separates from the first latching element 362 by a distance. The distance of separation between the second latching element 364 and the first latching element 362 is roughly equal to the distance the roller 360 travels towards the third direction 396 after the optical module detaches from the first latching element 362 and re-engages with the second latching element 364. Thereafter, the roller 360 moves to the second terminal 344 of the driving belt 340. Due to pressure on the second spiral groove 367 by the second lever rod 354 (as shown in FIGS. 9A and 9B), the roller 360 rotates in the first direction 392. At this moment, the second latching element 364 detaches from the optical module 310 and the third latching element 366 re-engages with the printer module 320 to form a configuration as shown in FIG. 10C. Hence, the printer module 320 may carry out printing jobs.

If a user wishes to switch from engaging with the printer module 320 to the optical module 310 for conducting scanning tasks, the roller 360 moves to the second end 344 of the driving belt 340. Due to pressure on the second spiral groove 367 by the second lever rod 354 (as shown in FIGS. 9A and 9B), the roller 360 rotates in the first direction 392. At this moment, the third latching element 366 detaches from the printer module 320 and the first latching element 362 re-engages with the optical module 310 to form a configuration as shown in FIG. 10A. Hence, the optical module 310 may carry out scanning operations.

In the aforementioned process of switching between the optical module 310 and the printer module 320, the first latching element 362, the second latching element 364 and the third latching element 366 all have a retractable mechanism. Hence, as the roller 360 rotates, the latching elements (362, 364, 366) may retract into the interior of the roller 360 when made to contact with casing of either the optical module 310 or the printer module 320. With this arrangement, the whereabouts of the first latching element 362, the second latching element 364 and the third latching element 366 have little effect on the rotation of the roller 360. When the first latching element 362, the second latching element 364 or the third latching element 366 no longer touches the casing of the optical module 310 or the printer module 320, the latching element springs back to its former configuration. The first latching element 362 or the second latching element 364 may click into a latching hole 312 on the optical module 310. When the driving belt 340 moves to drive the roller 360, the optical module 310 can move synchronously. The third latching element 366 may click into a latching hole 322 on the printer module 320. Hence, when the driving belt 340 moves to drive the roller 360, the printer module 320 can move synchronously.

In the aforementioned changer, both the first lever rod 352 and the second lever rod 354 are fixed in position. Therefore, the changer has a simpler structural design than a conventional changer with movable first and second lever rod.

Furthermore, this invention may also utilize the first latching element and the second latching element for joining the roller and the printer module together while the third latching element is used for joining the roller and the optical module together.

In summary, the optical module/printer module changer and the method of operating the optical module/printer module system according to this invention reduces overall loading of driving electric motor and hence saves electrical energy.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. An apparatus comprising:
    a printer module;
    an optical module; and
    a changer configured to selectively couple to either the printer module or the optical module, wherein the changer is configured to rotate into a first position to attach to the printer module and rotate into a second position to attach to the optical module.

2. The apparatus according to claim 1 wherein the changer is configured to drive the printer module after being rotated into the first position and drive the optical module after being rotated into the second position.

3. The apparatus according to claim 1 wherein the changer further comprises a roller having a latching element configured to latch with either the optical module or the printer module.

4. The apparatus according to claim 3 further comprising:
    a first spiral groove located on a side surface of the roller, the spiral groove having a gradually increasing depth; and a lever rod configured to press against a bottom surface of the first spiral groove forcing the roller to rotate from the first position to the second position.

5. The apparatus according to claim 4 further comprising:
a second spiral groove located on the same or a different side surface of the roller, the second spiral groove having a gradually increasing depth; and
a second lever rod configured to press against a bottom surface of the second spiral groove forcing the roller to rotate from the second position to the first position.

6. The changer of claim 3 wherein the latching element extends from a perimeter surface of the roller and is configured to retract into an interior of the roller when an external force is applied to the latching element and spring back to its original latching element position when the external force is removed.

7. An apparatus, comprising:
means for selectively detaching from an optical module and attaching to a printer module;
means for driving the attached printer module;
means for selectively detaching from the printer module and attaching to the optical module;
means for driving the attached optical module;
means for rotating a changer into a first position to detach from the optical module and attach to the printer module; and
means for rotating the changer into a second position to detach from printer module and attach to the optical module.

8. The apparatus according to claim 7 further comprising:
means for rotating the changer in a clockwise direction to attach to one of the optical module or printer module; and
means for rotating the changer in a counter-clockwise direction to detach from the previously attached optical module or printer module and attach to the previously detached optical module or printer module.

9. The apparatus according to claim 8 further comprising means for receiving one or more rods that cause the changer to rotate in the clockwise direction and the counter-clockwise direction.

10. The apparatus according to claim 7 further comprising:
means for selectively detaching from the optical module and attaching to the printer module when the changer reaches a first end of a traveling path; and
means for selectively detaching from the printer module and attaching to the optical module when the changer reaches a second end of the traveling path.

11. The apparatus according to claim 7 further comprising:
means for latching the changer to the optical module or printer module;
means for retracting the latching means when an external force is applied to the changer; and
means for springing the latching means back to an original latching position when the external force is removed.

12. A method, comprising:
selectively connecting a changer to a first module at a first end of a module travel path in a scanner/printer;
driving the first module with the changer along the module travel path;
selectively disconnecting the changer from the first module and connecting the changer to a second module at the same first end of the module travel path in the scanner/printer; and
driving the second module with the changer along the module travel path.

13. The method according to claim 12 wherein the first module is an optical module and the second module is a printing module.

14. The method according to claim 12 further comprising:
rotating the changer into a first position to detach from the first module and attach to the second module; and
rotating the changer into a second position to detach from the second module and attach to the first module.

15. The method according to claim 14 further comprising:
rotating the changer in a clockwise direction to attach to the first module; and
rotating the changer in a counter-clockwise direction to attach to the second module.

16. The method according to claim 12 further comprising receiving one or more rods that cause the changer to switch the connections between the first and second module.

17. The method according to claim 12 further comprising:
using a latch to connect the changer to the first or second module;
retracting the latch when an external force is applied to the changer; and
springing the latch back to an original latching position when the external force is removed.

* * * * *